(12) United States Patent
Tanigawa et al.

(10) Patent No.: US 7,018,234 B2
(45) Date of Patent: Mar. 28, 2006

(54) CARD CONNECTOR ASSEMBLY

(75) Inventors: Junichi Tanigawa, Kanagawa (JP); Doron Lapidot, Tokyo (JP); Masayuki Aizawa, Tokyo (JP)

(73) Assignee: Tyco Electronics AMP K.K., Kanagawa-Ken (JP)

( * ) Notice: Subject to any disclaimer, the term of this patent is extended or adjusted under 35 U.S.C. 154(b) by 0 days.

(21) Appl. No.: 10/995,970

(22) Filed: Nov. 23, 2004

(65) Prior Publication Data
US 2005/0118863 A1  Jun. 2, 2005

(30) Foreign Application Priority Data
Nov. 28, 2003  (JP) .............................. 2003-400031

(51) Int. Cl.
*H01R 13/60* (2006.01)

(52) U.S. Cl. ...................................... 439/541.5; 439/79

(58) Field of Classification Search ............ 439/541.5, 439/79, 92, 64, 607, 159
See application file for complete search history.

(56) References Cited

U.S. PATENT DOCUMENTS

| 3,736,471 | A | * | 5/1973 | Donze et al. ................ 361/684 |
| 5,080,609 | A | * | 1/1992 | Fabian et al. ............ 439/541.5 |
| 5,267,876 | A | * | 12/1993 | Rupert et al. ............ 439/541.5 |
| 5,299,089 | A | * | 3/1994 | Lwee .......................... 361/684 |
| 5,775,923 | A | * | 7/1998 | Tomioka ...................... 439/79 |
| 5,816,831 | A | * | 10/1998 | Clark ............................ 439/79 |
| 6,183,273 | B1 | * | 2/2001 | Yu et al. ....................... 439/92 |
| 6,600,865 | B1 | * | 7/2003 | Hwang ....................... 385/134 |

FOREIGN PATENT DOCUMENTS

| JP | 08-264240 | 10/1996 |
| JP | 09-022762 | 1/1997 |

* cited by examiner

*Primary Examiner*—Hien Vu
(74) *Attorney, Agent, or Firm*—Barley Snyder LLC

(57) ABSTRACT

The present invention provides a card connector assembly that is used for the connection with two cards having mutually different transmission speeds and that can maintain transmission characteristics while minimizing the amount of an expensive FPC used. The card connector assembly comprises stacked first and second card connectors for connection with two cards having mutually different transmission speeds, and transmission paths for connecting the first and second card connectors to a circuit board. The transmission path for the first card connector to which a card with a relatively high transmission speed is to be connected is constructed from an FPC to which the first card connector is connected. The transmission path for the second card connector to which a card with a relatively low transmission speed is to be connected comprises terminal parts that extend from the second card connector, and a rigid board to which the terminal parts are connected. The FPC and the rigid board are integrally fastened together.

9 Claims, 7 Drawing Sheets

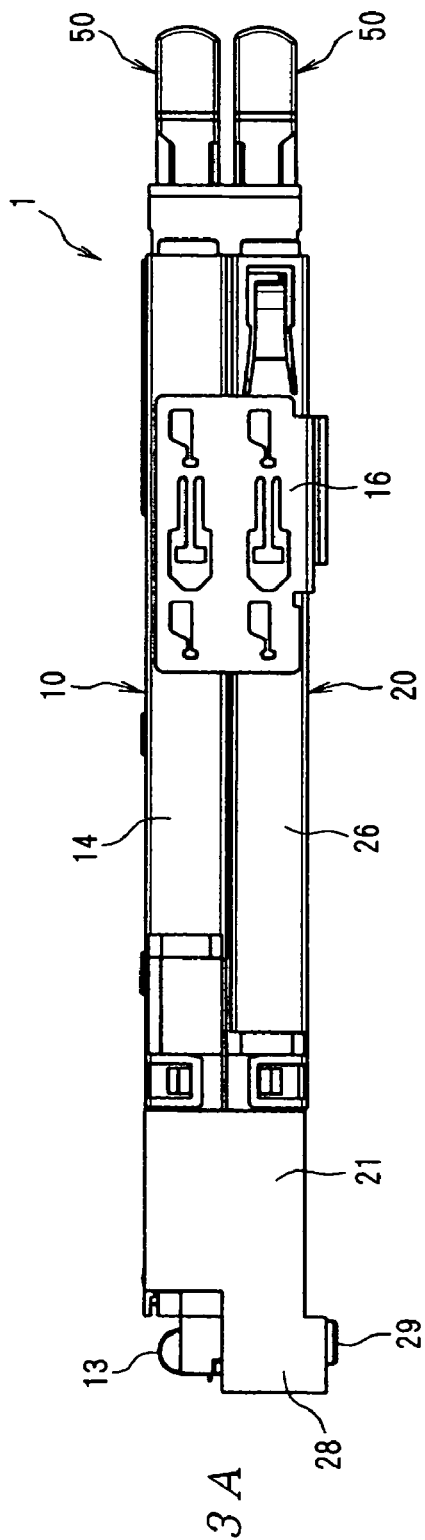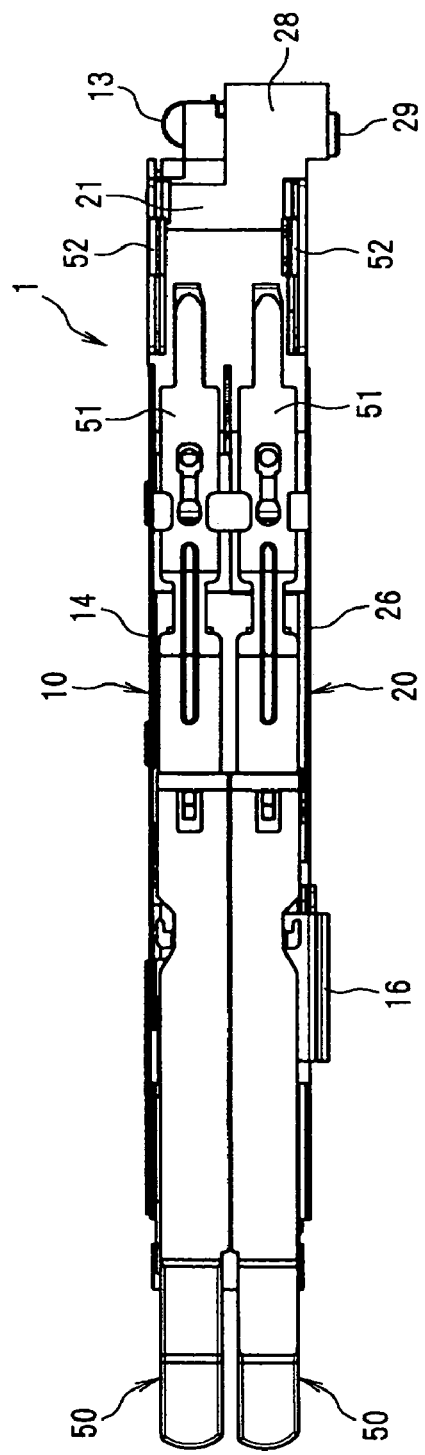
FIG. 3A
FIG. 3B

PRIOR ART

CARD CONNECTOR ASSEMBLY

FIELD OF THE INVENTION

The present invention relates to a card connector assembly comprising stacked first and second card connectors for connection with two cards having mutually different transmission speeds.

BACKGROUND

A conventional card connector assembly is shown in FIGS. 6A and 6B (see Japanese Patent Application No. 9-22762). In this card connector assembly, two card connectors (first and second card connectors) that receive PCMCIA standard PC cards are stacked.

Here, the card connector assembly 200 shown in FIG. 6A is constructed by vertically stacking two card connectors that receive PC cards C, i.e., a first card connector 201 and a second card connector 210.

The first card connector 201 is constructed by disposing contacts 203 that contact a PC card C in two rows (upper and lower rows) in the upper portion of the housing 202. A ground member 205 that contacts the ground part of the PC card C that is received in the first card connector 201 is formed on the top surface of the housing 202 of the first card connector 201.

Furthermore, the second card connector 210 is constructed by disposing contacts 211 that contact a PC card (not shown) in two rows (upper and lower rows) in the lower portion of the housing 202. A ground member 213 that contacts the ground part of the PC card that is received in the second card connector 210 is formed in the portion of the housing 202 that is lower than the first card connector 201.

The first card connector 201 and second card connector 210 are placed on a common circuit board (not shown in the figure). The contacts 203 and ground member 205 of the first card connector 201 are connected to the circuit board by connection parts 204 of the contacts 203 that extend forward (toward the right in FIG. 6A) from the housing 202, connection parts 206 of the ground member 205, a relay board 207 that is connected to these connection parts 204 and 206, and a relay connector 220 that connects the relay board 207 to the circuit board. Furthermore, the contacts 211 and ground member 213 of the second card connector 210 are connected to the circuit board by connection parts 212 of the contacts 211 that extend forward from the housing 202, connection parts 214 of the ground member 213, a relay board 215 that is connected to these connection parts 212 and 214, and the relay connector 220 that connects the relay board 215 to the circuit board.

Moreover, the card connector assembly 230 shown in FIG. 6B is a modified example of the card connector assembly 200 shown in FIG. 6A, and is constructed by vertically stacking two card connectors (a first card connector 231 and a second card connector 240) that receive PC cards C.

The first card connector 231 is constructed by disposing contacts 233 that contact a PC card C in two rows (upper and lower rows) in the upper portion of the housing 232. A ground member 235 that contacts the ground part of the PC card C that is received in the first card connector 231 is formed on the top surface of the housing 232 of the first card connector 231. Furthermore, the second card connector 240 is constructed by disposing contacts 241 that contact a PC card (not shown) in two rows (upper and lower rows) in the lower portion of the housing 232. A ground member 243 that contacts the ground part of the PC card that is received in the second card connector 240 is formed in the portion of the housing 232 that is lower than the first card connector 231.

The first card connector 231 and second card connector 240 are placed on a common circuit board (not shown in the figure). The contacts 233 and ground member 235 of the first card connector 231, and the contacts 241 and ground member 243 of the second card connector 240, are connected to the circuit board by connection parts 234, 236, 242 and 244 that extend from the housing 232, a single relay board 237 that is connected to these connection parts 234, 236, 242 and 244, and a relay connector 250 that connects the relay board 237 to the circuit board.

Furthermore, the card connector assembly shown in FIG. 7 (see Japanese Patent Application No. 8-264240), for example, is another example of a card connector assembly in which two card connectors (first and second card connectors) that receive PCMCIA standard PC cards are stacked.

The card connector assembly 300 shown in FIG. 7 is constructed by vertically stacking two card connectors (a first card connector 301 and a second card connector 310) that receive PC cards (not shown in the figure).

In the first card connector 301, contacts that contact a PC card are provided in two rows (upper and lower rows) on the front wall surface (right wall surface in FIG. 7) of a housing 302, and connection parts 303 of the contacts are formed to protrude forward from this front wall surface. A ground member that contacts the ground part of the PC card received in the first card connector 301 is provided in the upper portion of the front wall surface of the housing 302 of the first card connector 301, and connection parts 304 of the ground member are formed to protrude forward from this front wall surface. Furthermore, in the second card connector 310, contacts that contact a PC card are provided in two rows (upper and lower rows) on the front wall surface (right wall surface in FIG. 7) of a housing 311, and connection parts 312 of the contacts are formed to protrude forward from this front wall surface. A ground member that contacts the ground part of the PC card received in the second card connector 310 is provided in the upper portion of the front wall surface of the housing 311 of the second card connector 310, and connection parts 313 of the ground member are formed to protrude forward from this front wall surface.

The first card connector 301 and second card connector 310 are placed on a common circuit board 330. The contacts and ground member of the first card connector 301, and the contacts and ground member of the second card connector 310, are connected to the circuit board 330 by the connection parts 303, 304, 312 and 313 that extend from the respective front wall surfaces of the housings 302 and 311, a flexible circuit board (hereafter referred to simply as "FPC") 305 that is connected to these connection parts 303, 304, 312 and 313, and a relay connector 320 that connects the FPC 305 to the circuit board 330.

Meanwhile, as a result of the spread of portable-type personal computers in recent years, there has been an increasing demand not only for such card connector assemblies that receive PCMCIA standard PC cards, but also for a card connector assembly comprising a first card connector and a second card connector that are stacked for the connection with two cards such as memory cards that have mutually different transmission speeds. An example is a card connector assembly comprising a connector that is connected to a memory card with a relatively high transmission speed (approximately 3 GHz) as the first card connector, and a connector that is connected to a PCMCIA standard PC card with a relatively low transmission speed as the second card connector.

When an attempt is made to use the card connector assemblies 200 and 230 shown in FIGS. 6A and 6B or the card connector assembly 300 shown in FIG. 7 to connect with cards having mutually different transmission speeds, the following problems have been encountered.

Specifically, in the case of the card connector assembly 200 shown in FIG. 6A, the signal transmission path between the first card connector 201 and the relay connector 220 is constructed from the connection parts 204 of the two rows (upper and lower rows) of the contacts 203, and the relay board 207 that is connected to these connection parts 204. Furthermore, the signal transmission path between the second card connector 210 and the relay connector 220 is constructed from the connection parts 212 of the two rows (upper and lower rows) of the contacts 211, and the relay board 215 that is connected to these connection parts 212. In these signal transmission paths, since the connection parts 204 of the contacts 203 and the connection parts 212 of the contacts 211 are each formed in two rows (upper and lower rows), in cases where a memory card having a relatively high transmission speed of approximately 3 GHz is connected to one of the connectors 201 and 210, noise is produced between the connection parts 204 of the two rows (upper and lower rows) or between the connection parts 212 of the two rows (upper and lower rows), so that such a card connector assembly is not suitable for high-speed transmission. Moreover, since the connection between the connection parts 204 of the contacts 203 and the relay board 207, and the connection between the connection parts 212 of the contacts 211 and the relay board 215, are accomplished via through-holes, the energy consumption of transmission signals in the connection parts via through-holes is large, so that noise tends to be introduced. Thus, such a card connector assembly is not suitable for high-speed transmission for this reason as well.

Furthermore, in the card connector assembly 230 shown in FIG. 6B as well, since the connection parts 234 of the contacts 233 and the connection parts 242 of the contacts 241 are similarly each formed in two rows (upper and lower rows) in the signal transmission paths, in cases where a memory card having a high transmission speed of approximately 3 GHz is connected to one of the connectors 231 and 240, noise is introduced between the connection parts 234 of the two rows (upper and lower rows) or between the connection parts 242 of the two rows (upper and lower rows), so that such a card connector assembly is not suitable for high-speed transmission. Moreover, since the connection between the connection parts 234 of the contacts 233 and the relay board 237, and the connection between the connection parts 242 of the contacts 241 and the relay board 237, are also accomplished via through-holes, the energy consumption of transmission signals in the connection parts via through-holes is large, so that such a card connector assembly is not suitable for high-speed transmission.

Meanwhile, in the card connector assembly 300 shown in FIG. 7, the signal transmission paths between the first and second card connectors 301 and 310 and the relay connector 320 are constructed from the connection parts 303 and 312 of the two rows (upper and lower rows) each, and the FPC 305 that is connected to these connection parts 303 and 312. In these signal transmission paths, the connection parts 303 and 312 are each formed in two rows (upper and lower rows), but the length of these parts is relatively short, while the FPC 305 is relatively long; accordingly, in cases where a memory card having a high transmission speed of approximately 3 GHz is connected to one of the connectors 301 and 310, noise introduced between the connection parts 303 of the two rows (upper and lower rows) or between the connection parts 312 of the two rows (upper and lower rows) is small, so that this card connector assembly can be used for high-speed transmission as well. However, there is a problem in that a relatively long FPC 305 is needed, so that the cost of the product becomes high. Moreover, since the connection between the connection parts 303 and 312 and the FPC 305 is accomplished via through-holes, the energy consumption of transmission signals in the connection parts via through-holes is large, so that the transmission characteristics are somewhat inferior even with the use of the FPC 305.

SUMMARY

Accordingly, the present invention was devised in light of the problems described above; it is an object of the present invention to provide a card connector assembly that is used to connect two cards with mutually different transmission speeds, and that can maintain transmission characteristics while minimizing the cost associated with an expensive FPC. According to an exemplary embodiment of the present invention, a card connector assembly is provided comprising first and second card connectors that are stacked for the connection with two cards having mutually different transmission speeds, and transmission paths for connecting the first and second card connectors to a circuit board on which these first and second card connectors are to be placed. The transmission path for the first card connector, to which a card having a relatively high transmission speed is to be connected, is constructed from a flexible circuit board, to which the first card connector is connected. The transmission path for the second card connector, to which a card having a relatively low transmission speed is to be connected, comprises terminal parts that extend from the second card connector and a rigid board to which these terminal parts are connected. The flexible circuit board and the rigid board are integrally fastened together.

BRIEF DESCRIPTION OF THE DRAWINGS

FIGS. 3A and 3B show the card connector assembly shown in FIG. 1, with FIG. 3A being a left-side view; and FIG. 3B being a right-side view;

DETAILED DESCRIPTION OF THE EMBODIMENT(S)

Next, an embodiment of the present invention will be described with reference to the figures. The card connector assembly 1, as shown in FIGS. 1, 2, 3A and 3B, 4, and 5, is constructed by vertically stacking, in two tiers, a first card connector 10 for connecting a card (not shown in the figures) such as a memory card having a relatively high transmission speed, and a second card connector 20 for connecting a card (not shown in the figures) such as a PCMCIA standard PC card having a relatively low transmission speed.

Figure 1:
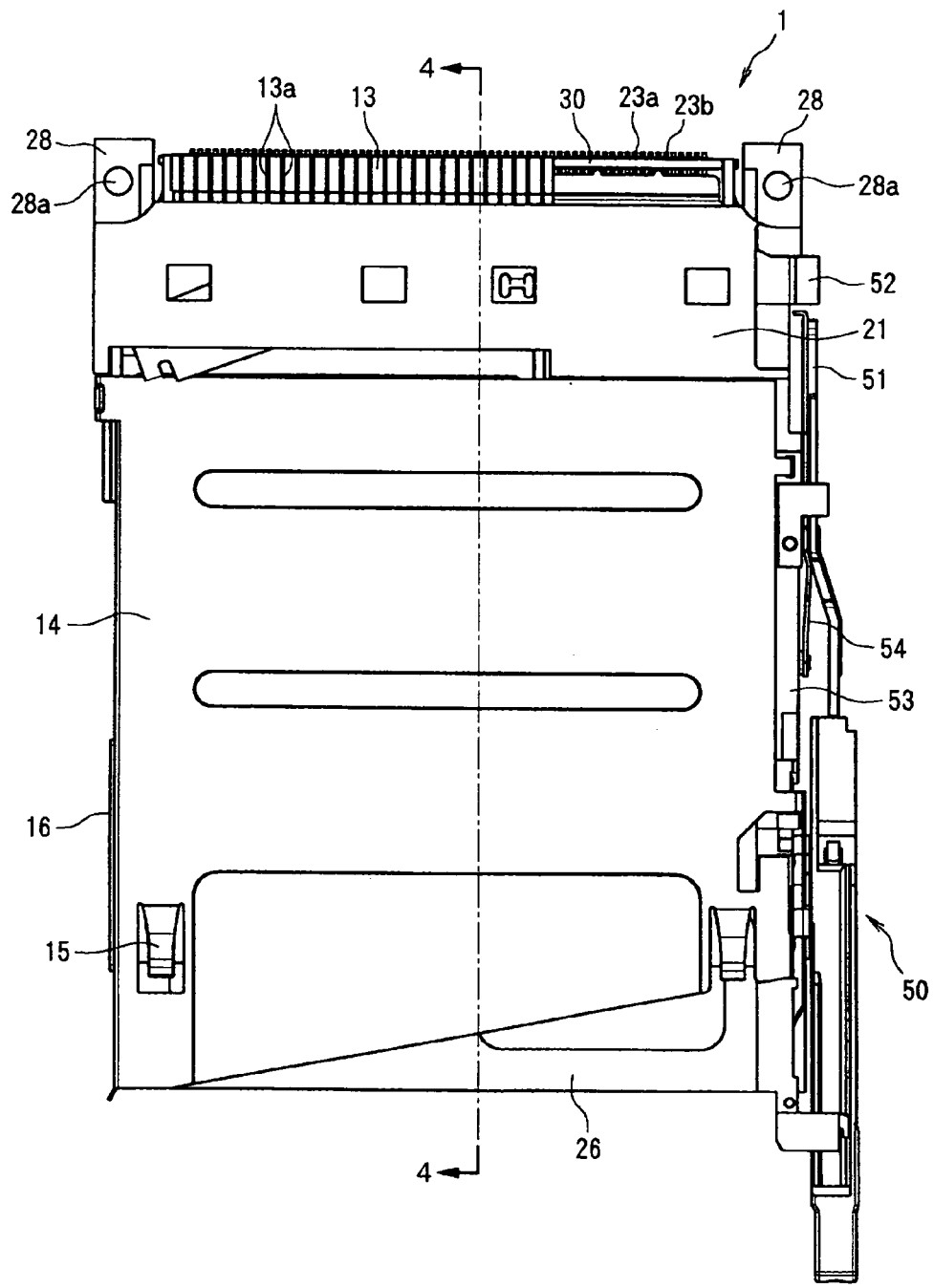
FIG. 1 is a plan view of a card connector assembly according to an exemplary embodiment of the present invention.
Figure 2:
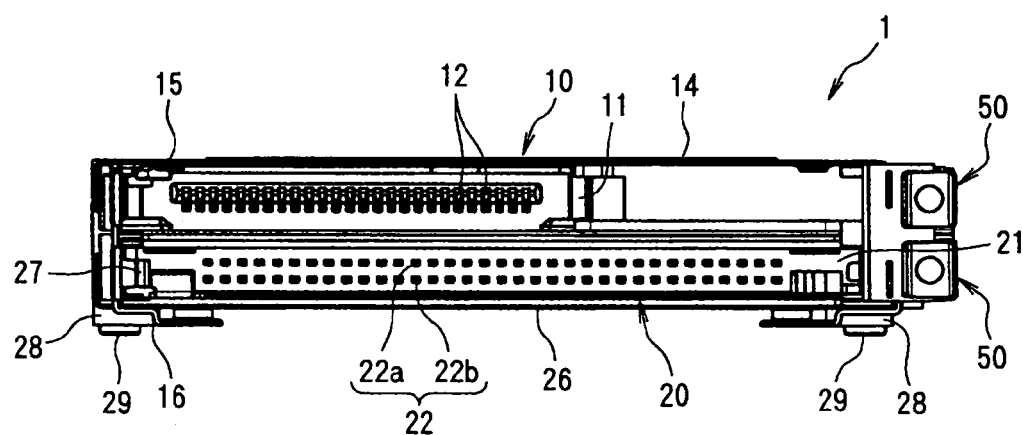
FIG. 2 is a front view of the card connector assembly shown in FIG. 1.
Figure 4:
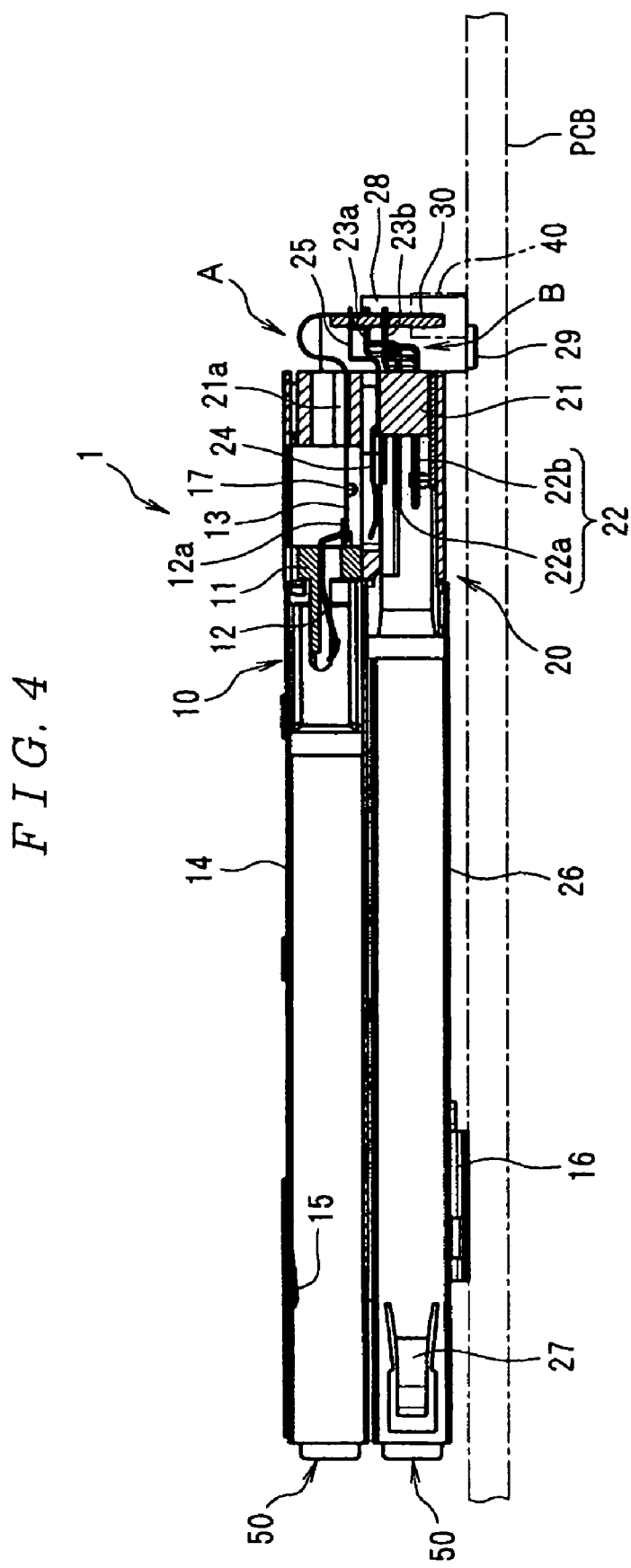
FIG. 4 is a sectional view along line 4—4 in FIG. 1 (in FIG. 4, the relay connector and circuit board are indicated with a one-dot chain line)

As is shown in FIG. 4, the first card connector 10 comprises a first housing 11 which extends in the direction of width (in the left-right direction in FIG. 1), and a plurality of first contacts 12. The first housing 11 is attached to a second housing 21 for the second card connector 20. The first contacts 12 contact the signal terminals of a card that is received in the first card connector 10. The first contacts 12 are press-fitted to the first housing 11 in a single row along the direction of width of the first housing 11. A metal shell 14 which extends rearward (downward in FIG. 1) from the portion where the first contacts 12 are secured, and which covers the entire card connector assembly 1, is attached to the top surface of the first housing 11. Ground contact tongue parts 15 which contact the ground part of a card that is received in the first card connector 10 are provided on the metal shell 14. These ground contact tongue parts 15 are grounded to the circuit board PCB (see FIG. 4) by means of metal brackets 16 disposed on the side portions of the card connector assembly 1.

Meanwhile, the second card connector 20 comprises a second housing 21 which extends in the direction of width (in the left-right direction in FIG. 1), and a plurality of second contacts 22 which contact the signal terminals of a card that is received in the second card connector 20. The second contacts 22 are press-fitted to the second housing 21 in two rows (upper and lower rows) along the direction of width of the second housing 21. A ground plate 24 which contacts the signal ground part of a card that is received in the second card connector 20 is attached to the second housing 21 in a position that is lower than the first card connector 10. Furthermore, a metal shell 26 which extends rearward (downward in FIG. 1) from the portion where the second contacts 22 are secured, and which covers the entire undersurface of the card connector assembly 1, is attached to the undersurface of the second housing 21. Ground contact tongue parts 27 which contact the frame ground part of a card that is received in the second card connector 20 are provided on the side walls of the metal shell 26. These ground contact tongue parts 27 are grounded to the circuit board PCB by means of metal brackets 16 disposed on the side parts of the card connector assembly 1.

So-called push-push-type ejection mechanisms 50 are respectively disposed on a side part of the first card connector 10 and of the second card connector 20, so that cards that are respectively received in the first card connector 10 and second card connector 20 can be ejected by these ejection mechanisms 50. Each ejection mechanism 50 comprises a push bar 51, a cam bar 52 that is pivoted by the push bar 51 to eject a card, a cam member 53 that has a heart-shaped cam groove, and a cam follower member 54 that has a cam follower for following the cam groove.

Furthermore, the first card connector 10 and second card connector 20 are placed on the common circuit board PCB as shown in FIG. 4. A pair of mounting parts 28 are provided on either end, in the direction of width, of the second housing 21 in order to place these first and second card connectors 10 and 20 on the circuit board PCB, and a through-hole 28a used for an attachment screw is formed in each of the mounting parts 28. Moreover, a positioning projection 29 with respect to the circuit board PCB is disposed on the bottom surface of each of the mounting parts 28.

In addition, the card connector assembly 1 is provided with a transmission path A for connecting the first contacts 12 of the first card connector 10 to the circuit board PCB, and a transmission path B for connecting the second contacts 22 and ground plate 24 of the second card connector 20 to the circuit board PCB.

Figure 5:
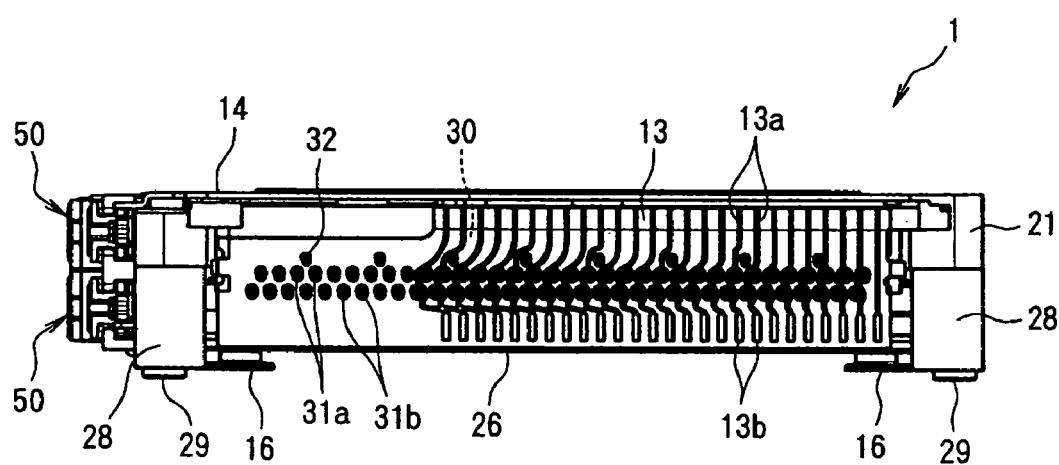
FIG. 5 is a back view of the card connector assembly shown in FIG. 1.
Figure 6A:
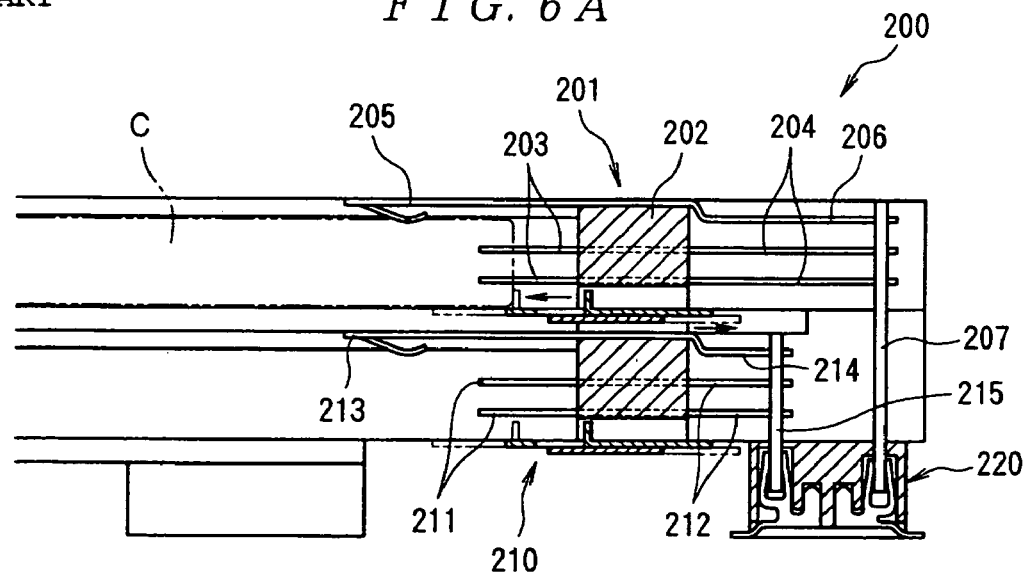
FIGS. 6A and 6B show sectional views of conventional examples of card connector assemblies.
Figure 6B:
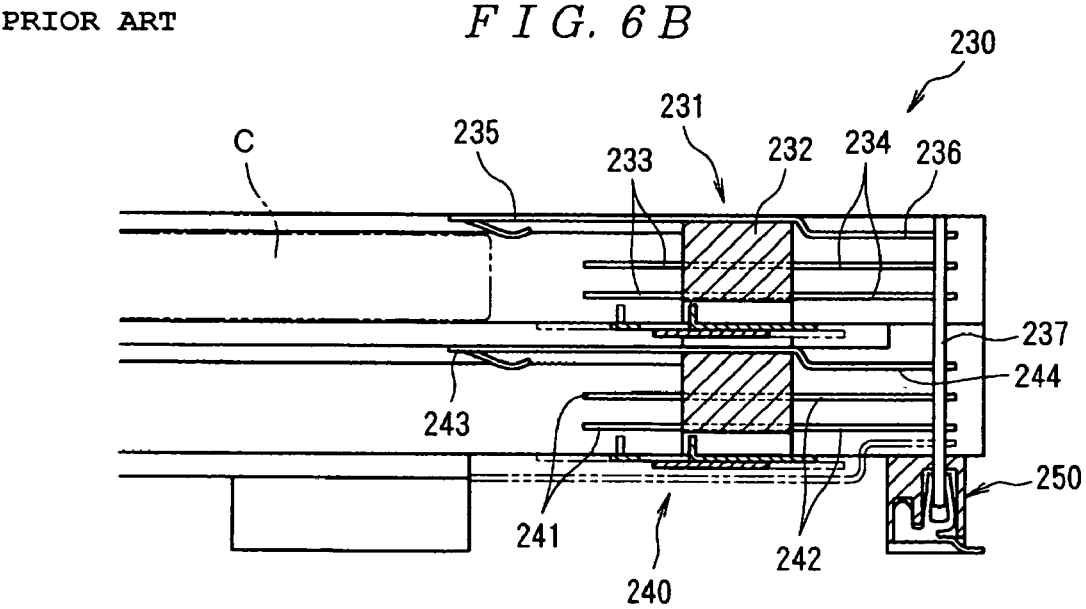
Figure 7:
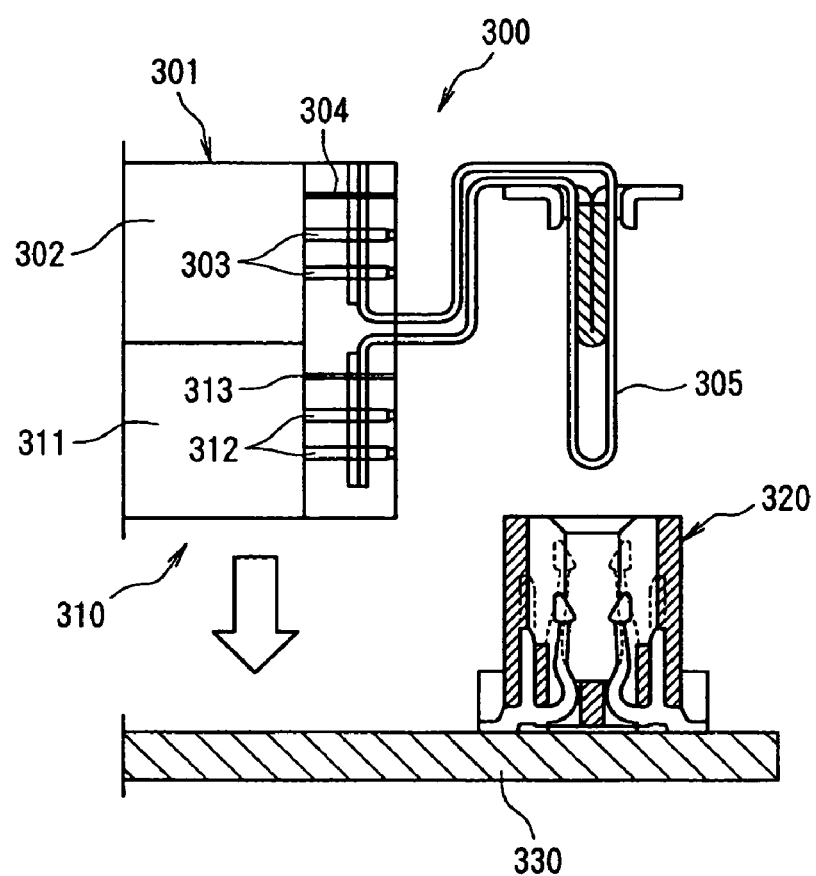
FIG. 7 is a sectional view of another conventional example of a card connector assembly.

The transmission path A for connecting the first card connector 10 to the circuit board PCB is constructed from a flexible circuit board (hereafter referred to simply as "FPC") 13 to which the feet 12a of the first contacts 12 of the first card connector 10 are connected. The FPC 13 extends forward from the first card connector 10 with the feet 12a of the first contacts 12 being connected to this FPC by surface-mounting on the rear end of the top surface of the FPC, and extends forward by passing through a through-hole 21a formed in the first housing 11. The positioning of the FPC 13 in the forward-rearward direction and in the left-right direction is accomplished by positioning bosses 17 that are formed to protrude from the bottom of the walls on both ends of the first housing 11 in the direction of width. As is shown in FIG. 5, a plurality of signal conductive patterns 13a are formed on the front surface (top surface) of the FPC 13 in a single row at a specified pitch along the direction of width, and signal conductive pads 13b are formed on the front end parts (i.e., the end parts on the opposite side from the side to which the feet 12a of the first contacts 12 are connected) of the respective signal conductive patterns 13a. The feet 12a of the first contacts 12 are connected by soldering to the rear end parts of the signal conductive patterns 13a, and thus electrically connected to the conductive pads 13b. The signal conductive patterns 13a and conductive pads 13b constitute the "signal layer". Meanwhile, a mesh-form ground layer is formed on the back surface (undersurface) of the FPC 13. Furthermore, through-holes 31a and 31b through which terminal parts 23a and 23b (described later) are passed, and through-holes 32 through which connection parts 25 of the ground plate 24 are passed, are formed in the FPC 13.

Furthermore, the transmission path B for connecting the second card connector 20 to the circuit board PCB comprises a plurality of terminal parts 23a that extend to the front of the second housing 21 from the respective second contacts 22a of the upper row, a plurality of terminal parts 23b that extend to the front of the second housing 21 from the respective second contacts 22b of the lower row, a plurality of connection parts 25 that extend to the front of the second housing 21 from the ground plate 24, and a rigid board 30 to which the respective terminal parts 23a and 23b and connection parts 25 are connected. The outer surface (right surface in FIG. 4) of the rigid board 30 is bonded to the back surface on the front end side of the FPC 13 by an adhesive, so that the FPC 13 and the rigid board 30 are integrally fastened together. Here, the respective terminal parts 23a and 23b are arranged in two rows (upper and lower rows) along the direction of width of the rigid board 30. Furthermore, the respective terminal parts 23a and 23b are respectively connected by soldering to signal through-holes (not shown in the figures) that are arranged in two rows (upper and lower rows) in an alternately staggered fashion along the direction of width of the rigid board 30, and pass through the through-holes 31a and 31b that are formed in the FPC 13. The pitch in the direction of width of the through-holes formed in the rigid board 30 can be made small by arranging the signal through-holes in the rigid board 30 in two rows (upper and lower rows) in an alternately staggered fashion along the direction of width of the rigid board 30. Moreover, the respective connection parts 25 of the ground plate 24 are connected by soldering to ground through-holes (not shown in the figures) that are formed in a single row along the direction of width of the rigid board 30, and pass through the through-holes 32 that are formed in the FPC 13. Furthermore, signal conductive patterns (not shown in the figures) that are connected to the signal through-holes of the rigid board 30 are formed on the inner surface of the rigid board 30. The terminal parts 23*a* and 23*b* and these signal conductive patterns are electrically connected to each other by connecting the terminal parts 23*a* and 23*b* to the signal through-holes. In addition, ground conductive pattern (not shown in the figures) that is connected to the ground through-holes in the rigid board 30 are formed on the inner surface of the rigid board 30. The respective connection parts 25 and this ground conductive pattern are electrically connected to each other by connecting the respective connection parts 25 to the ground through-holes.

Furthermore, the rigid board 30 mates with a relay connector 40 disposed on the circuit board PCB when the first card connector 10 and second card connector 20 are placed on the circuit board PCB. As a result, the first contacts 12 of the first card connector 10 and the circuit board PCB are electrically connected to each other, and the second contacts 22 and ground plate 24 of the second card connector 20 and the circuit board PCB are electrically connected to each other.

If a card that has a relatively high transmission speed is connected to the first card connector 10 in a state in which the first contacts 12 of the first card connector 10 and the circuit board PCB are electrically connected to each other, the signal terminals of the card are connected to the circuit board PCB via the first contacts 12, the signal conductive patterns 13*a* and conductive pads 13*b* of the FPC 13, and the relay connector 40. Here, since the signal conductive patterns 13*a* of the FPC 13 are formed in a single row along the direction of width of the FPC 13, noise introduced between adjacent signal conductive patterns 13*a* can be reduced, which makes it possible to produce an inexpensive card connector assembly 1 that can maintain transmission characteristics and that is therefore suitable for high-speed transmission.

Furthermore, when a card that has a relatively high transmission speed is connected to the first card connector 10, the ground part of the card is grounded to the circuit board PCB via the ground contact tongue parts 15 and metal brackets 16.

On the other hand, if a card that has a relatively low transmission speed is connected to the second card connector 20 in a state in which the second contacts 22 and ground plate 24 of the second card connector 20 and the circuit board PCB are electrically connected to each other, the signal terminals of the card are connected to the circuit board PCB via the second contacts 22*a* and 22*b*, the terminal parts 23*a* and 23*b*, the pattern on the inner surface of the rigid board 30, and the relay connector 40. In this case, furthermore, the signal ground part of the card is grounded to the circuit board PCB via the ground plate 24, the pattern on the inner surface of the rigid board 30, and the relay connector 40. Moreover, the frame ground part of the card is grounded to the circuit board PCB via the ground contact tongue parts 27 and metal brackets 16.

Thus, in the card connector assembly 1 of the present embodiment, the transmission path A for signals used for the first card connector 10 to which a card with a relatively high transmission speed (in the case of use for signals) is constructed from the FPC 13 to which the first contacts 12 of the first card connector 10 are connected; on the other hand, the transmission path B used for the second card connector 20 to which a card with a relatively low transmission speed (in the case of use for signals) is constructed from the terminal parts 23*a* and 23*b* that extend from the second contacts 22*a* and 22*b* of the second card connector 20, and the rigid board 30 to which the terminal parts 23*a* and 23*b* are connected. Consequently, by using the FPC 13 only for the transmission path used for the first card connector 10 in which high-speed transmission is required, it is possible to obtain a card connector assembly 1 used for the connection with two cards having mutually different transmission speeds, with the used amount of an expensive FPC 13 minimized, and with the transmission characteristics maintained.

Furthermore, since the feet 12*a* of the first contacts 12 of the first card connector 10 are connected to the FPC 13 by surface-mounting, there is no through-hole connection in the transmission path for the first card connector 10, i.e., in the transmission path of a signal from the feet 12*a* of the first contacts 12 to the relay connector 40 (to the circuit board PCB in cases where the relay connector 40 is a surface-mounting-type connector), so that a card connector assembly 1 that is suitable for high-speed transmission can be obtained.

Moreover, the signal conductive patterns 13*a* and conductive pads 13*b* (a signal layer) are formed on the surface of the FPC 13 on the side to which the first contacts 12 of the first card connector 10 are connected by surface-mounting, and a ground layer is formed on the back surface of the FPC 13. Accordingly, the signal layer and the ground layer are disposed in close proximity to each other with a relatively thin insulating layer of the FPC 13 interposed, so that a card connector assembly 1 that is even more suitable for high-speed transmission can be obtained.

In addition, since the FPC 13 and rigid board 30 are integrally fastened together, insertion into the relay connector 40 is accomplished only in a single operation.

An embodiment of the present invention was described above. However, the present invention is not limited to this embodiment, and various alterations and modifications can be made.

For example, the ground layer formed on the back surface of the FPC 13 is not limited to a mesh shape; it would also be possible to devise the system so that the ground layer covers substantially the entire back surface of the FPC 13.

Alternatively, it would also be possible to form contact tongue parts on the metal shell 14 and to cause these contact tongue parts to contact the ground layer that is formed on the back surface of the FPC 13.

What is claimed is:

1. A card connector assembly comprising:
    stacked first and second card connectors for connection with two cards having mutually different transmission speeds, the first card connector having contacts disposed in a single row; and
    transmission paths for connecting the first and second card connectors to a circuit board on which the first and second card connectors are to be placed, wherein
    the transmission path for the first card connector to which a card having a relatively high transmission speed is to be connected is constructed from a flexible circuit board and the contacts of the firdt connector being surface mounted to the flexible circuit,
    the transmission path for the second card connector to which a card having a relatively low transmission speed is to be connected comprises terminal parts that extend from the second card connector, and a rigid board to which the terminal parts are connected, and the flexible circuit board being integrally fastened to the back of the rigid.

2. The card connector assembly according to claim 1, wherein a signal layer is formed on one surface of the flexible circuit board on the side to which the first card connector is connected by surface-mounting, and a ground layer is formed on the other surface of the flexible circuit board.

3. The card connector assembly according to claim 1, wherein the flexible circuit board and the rigid board are integrally fastened by an adhesive.

4. The card connector assembly according to claim 1, wherein the first and second card connectors further comprise ground contact tongue parts fix contacting the frame ground part of the first and second cards.

5. The card connector assembly according to claim 1, wherein the first and second card connectors comprise first and second housings that extend in a direction of width of the card connector assembly and receive a plurality of contacts.

6. The card connector assembly according to claim 5, wherein first and second housings are staggered in a direction that is essentially perpendicular to a direction of stacking and the direction of width.

7. The card connector assembly according to claim 6, wherein the first housing has an opening therethrough and the flexible circuit board extends through the opening.

8. The card connector assembly according to claim 1, wherein the flexible circuit board has a front face carrying conductive traces that form a portion of the transmission path for the first card connector.

9. The card connector assembly according to claim 8, wherein the flexible circuit board has a back face opposite the front face and carrying a grounding structure.

* * * * *

UNITED STATES PATENT AND TRADEMARK OFFICE
CERTIFICATE OF CORRECTION

PATENT NO. : 7,018,234 B2
APPLICATION NO. : 10/995970
DATED : March 28, 2006
INVENTOR(S) : Tanigawa et al.

It is certified that error appears in the above-identified patent and that said Letters Patent is hereby corrected as shown below:

In column 8, line 64, "the contacts of the firdt connector" should read --the contacts of the first connector--.

In column 8, line 65, after "the flexible circuit" insert --board--

In column 9, line 5, after "back of the rigid" insert --board.--

In column 9, line 17 "tongue parts fix contacting" should read --tongue parts for contacting--.

Signed and Sealed this

Tenth Day of October, 2006

JON W. DUDAS
*Director of the United States Patent and Trademark Office*